United States Patent
Niebling et al.

(10) Patent No.: US 11,193,543 B2
(45) Date of Patent: Dec. 7, 2021

(54) SEALING ARRANGEMENT FOR A WHEEL BEARING

(71) Applicant: Schaeffler Technologies AG & Co. KG, Herzogenaurach (DE)

(72) Inventors: Peter Niebling, Bad Kissingen (DE); Andreas Becker, Fuchsstadt (DE); Alexander Happ, Hofheim/Lendershausen (DE); Florian Koeniger, Schweinfurt (DE); Andreas Kaiser, Werneck (DE)

(73) Assignee: SCHAEFFLER TECHNOLOGIES AG & CO. KG, Herzogenaurach (CH)

( * ) Notice: Subject to any disclaimer, the term of this patent is extended or adjusted under 35 U.S.C. 154(b) by 0 days.

(21) Appl. No.: 16/772,870

(22) PCT Filed: Sep. 19, 2018

(86) PCT No.: PCT/DE2018/100793
§ 371 (c)(1),
(2) Date: Jun. 15, 2020

(87) PCT Pub. No.: WO2019/114853
PCT Pub. Date: Jun. 20, 2019

(65) Prior Publication Data
US 2021/0164519 A1   Jun. 3, 2021

(30) Foreign Application Priority Data

Dec. 15, 2017   (DE) .......................... 102017011640.7
Mar. 12, 2018   (DE) .......................... 102018105560.9

(51) Int. Cl.
*F16C 33/78*   (2006.01)
*F16C 19/18*   (2006.01)

(52) U.S. Cl.
CPC .......... *F16C 33/784* (2013.01); *F16C 19/183* (2013.01); *F16C 33/7823* (2013.01); *F16C 2326/02* (2013.01)

(58) Field of Classification Search
CPC .... F16C 19/183; F16C 19/184; F16C 19/185; F16C 19/186; F16C 19/187; F16C 19/386;
(Continued)

(56) References Cited

U.S. PATENT DOCUMENTS

| 8,240,674 B2 | 8/2012 | Harlmnann et al. |
| 8,979,385 B2 | 3/2015 | Haepp et al. |

(Continued)

FOREIGN PATENT DOCUMENTS

| CN | 105518325 | 4/2016 |
| CN | 107131214 | 9/2017 |

(Continued)

*Primary Examiner* — Phillip A Johnson
(74) *Attorney, Agent, or Firm* — Volpe Koenig

(57) ABSTRACT

A seal arrangement for a wheel bearing having first bearing part and a second bearing part integrally connected to a wheel bearing flange, between which bearing parts rolling elements are guided. The sealing arrangement includes: a carrier element, which is connected to the first bearing part and an elastic element is provided on the carrier element. The elastic element has at least one sealing lip, and the carrier element has a fastening section, which is connected to the first bearing part. A stop part is fastened to the second bearing part with which the at least one sealing lip is in rubbing contact. The wheel bearing flange has an axial projection at least partially surrounds an axial projection of the first bearing part, and an inner surface of the axial projection of the wheel bearing flange forms a seat for the stop part.

14 Claims, 3 Drawing Sheets

(58) Field of Classification Search
CPC .............. F16C 19/7823; F16C 19/7826; F16C 19/7853; F16C 19/7863; F16C 19/7879; F16C 19/7883; F16C 19/80; F16C 19/805; F16C 2326/02; B60B 27/0073
See application file for complete search history.

(56) References Cited

U.S. PATENT DOCUMENTS

| | | | |
|---|---|---|---|
| 9,546,687 B2 | 1/2017 | Kaiser et al. | |
| 2009/0257698 A1 | 10/2009 | Aritake et al. | |
| 2013/0127119 A1 | 5/2013 | Haepp et al. | |
| 2015/0003766 A1 | 1/2015 | Duch et al. | |
| 2015/0151574 A1* | 6/2015 | Barberis | B60B 27/0005 384/486 |
| 2016/0003302 A1* | 1/2016 | Seno | F16C 33/7886 277/351 |
| 2016/0347120 A1* | 12/2016 | Barberis | F16C 33/7826 |
| 2017/0198749 A1 | 7/2017 | Seo | |
| 2018/0126780 A1* | 5/2018 | Bertoia | F16C 33/7823 |

FOREIGN PATENT DOCUMENTS

| | | | | |
|---|---|---|---|---|
| CN | 206623619 | | 10/2017 | |
| DE | 10358876 | | 7/2005 | |
| DE | 102009052311 | | 5/2011 | |
| DE | 102010034385 | | 2/2012 | |
| DE | 102011003704 | | 8/2012 | |
| DE | 102016209109 | | 12/2016 | |
| EP | 2685118 | | 1/2014 | |
| GB | 2089906 | | 6/1982 | |
| JP | 2003148494 | | 5/2003 | |
| JP | 2005042764 | | 2/2005 | |
| JP | 2006132684 A * | | 5/2006 | .......... F16C 33/7879 |
| JP | 2015052350 | | 3/2015 | |
| JP | 2017048809 A * | | 3/2017 | ......... B60B 27/0094 |

* cited by examiner

SEALING ARRANGEMENT FOR A WHEEL BEARING

CROSS-REFERENCE TO RELATED APPLICATIONS

This application is a 371 National Phase of PCT/DE2018/100793, filed Sep. 19, 2018, which claims the benefit of German Patent Application No. 10 2017 011 640.7, filed Dec. 15, 2017, and German Patent Application No. 10 2018 105 560.9, filed Mar. 12, 2018, all of which are incorporated by reference herein as if fully set forth.

TECHNICAL FIELD

The disclosure relates to a seal arrangement of a wheel bearing, in particular for motor vehicles.

BACKGROUND

In wheel bearings, it is necessary to ensure, by way of two-sided sliding sealing of the space accommodating the raceways and rolling bodies and filled with lubricant, that neither particles of solid matter nor corrosive media are able to enter said space. Since, during driving operation, lateral accelerations can lead to slight tilting within the bearing arrangement, there is a risk that the lip seals used lift off from the sliding surfaces. The seals used can interact with a centrifuging plate which is produced from deformed sheet metal. The centrifuging plate, which is connected to a rotating wheel hub or a wheel bearing flange can form, together with a further sheet-metal ring, which is arranged in a stationary part of the wheel suspension, an additional labyrinth seal. Furthermore, sealing lips at least of a sealing ring extend in an axial or radial direction and are guided in a sliding manner on the centrifuging plate. The aforementioned components of the seal may also be integral constituent parts of a seal cartridge, in the case of which the sealing lips are axially pre-stressed in a defined manner.

Situated axially on the vehicle side on the wheel bearing is a predominantly axially directed opening between the rotation partners involved, which opening is occasionally covered by a joint bell of the adjacent constant-speed rotary joint. Axially on the wheel flange side, the opening between the rotation partners of the wheel bearing, due to the directly adjacent wheel flange, is directed radially outward and can be reached by spray water very easily. Since a centrifuging plate composed of sheet metal on the wheel flange leads to better rubbing sealing contact than the normally untreated wheel flange inner side, prior to the installation of the wheel bearing on the wheel hub, a centrifuging plate is pulled on so as to be adjacent to the wheel flange.

Slippage of the centrifuging plate can be triggered by vibration, continuous vibration loads or other causes, whereby the centrifuging plate on the outer surface axially approaches the rolling bodies and damages them in case of contact. This leads to failure of the wheel bearing.

DE 10 2010 034 385 A1 has disclosed a bearing seal for wheel bearings, in which a centrifuging plate is fixed on a wheel bearing flange which is connected in one piece to a rotating bearing ring of the wheel bearing. Supported against the centrifuging plate are sealing lips of a seal arrangement which is coupled to the further rotationally rigid bearing ring.

DE 10 2009 052 311 A1 describes a wheel bearing having a seal arrangement, which, on the flange side, encloses a centrifuging ring for sealing off the rolling bearing. In the state of installation, axial sealing lips are supported against the centrifuging plate via rubbing sealing contacts. The sealing lips are assigned a carrier which is fastened on an outer ring.

DE 103 58 876 A1 has disclosed a seal arrangement for wheel bearings, which, by means of two sealing rings, is arranged at an axial opening between the two parts of the wheel bearing that can be rotated relative to one another, and axially seals off the wheel bearing. For this purpose, the two sealing rings form a gap labyrinth which has a collection channel with an axially opening and radially extending sealing gap.

SUMMARY

It is an object of the present disclosure to provide a seal arrangement which provides reliable sealing action over the period of use and has an increased service life.

According to the disclosure, this object is achieved by a seal arrangement of a wheel bearing having a first bearing part and having a second bearing part which is connected in one piece to a wheel bearing flange, rolling bodies being guided between said bearing parts, wherein the seal arrangement comprises the following:

a carrier element, which is connected to the first bearing part, and wherein an elastic element is provided on the carrier element, wherein the elastic element has at least one sealing lip, and wherein the carrier element has a fastening portion which is connected to the first bearing part, a run-on part, which is fastened to the second bearing part and against which the at least one sealing lip is in rubbing contact, wherein the wheel bearing flange has an axial projection, wherein the axial projection of the wheel bearing flange at least partially surrounds an axial projection of the first bearing part, and wherein an inner surface of the axial projection of the wheel bearing flange forms a seat for the run-on part.

In known seal arrangements, a run-on part is pulled on the second bearing part in the region adjacent to the wheel bearing flange. However, this region of the seat of the run-on part is one of the most highly stressed regions of the second bearing part and of the wheel bearing flange. Stimulation due to high stress, triggered for example by vibrations, etc., results in axial movement of the run-on part. The axial movement causes the run-on part to approach the rolling bodies, whereby the latter can be damaged in case of contact.

In the seal arrangement according to the disclosure, the wheel bearing flange therefore has an axial projection which at least partially surrounds an axial projection of the first bearing part, and wherein an inner surface of the axial projection of the wheel bearing flange forms a seat for the run-on part. For such an embodiment, the seat of the sealing plate is relocated from the most highly stressed region. The fact that the seat of the run-on part is then provided on the axial projection of the wheel bearing flange means that movement of the run-on part can be avoided. In the region in which the run-on part had the seat according to the prior art, this is then preferably contact-free. It is furthermore advantageous that, by the partial surrounding of the axial projection of the first bearing part by the axial projection of the wheel bearing flange, a pre-seal in the form of a labyrinth seal is created.

According to one configuration, a first sealing gap is formed between an end side of the axial projection of the wheel bearing flange and an end side of the first bearing part.

Said sealing gap defines the pre-seal or the labyrinth seal. In this way, the infiltration of impurities or the like is made more difficult. At the same time, the sealing gap, in the event of axial impacts which act on the second bearing part or the wheel bearing flange, serves for dissipating the resulting active force from the wheel flange to the first bearing part. In this way, damage to the rolling bodies is avoided.

According to one embodiment of the disclosure, on an outer peripheral surface of the wheel bearing flange and/or on an outer peripheral surface of the first bearing part, at least one run-off channel is provided. These run-off channels serve to further enhance the sealing action and already to prevent the infiltration of impurities or the like into the sealing labyrinth.

Preferably, the carrier element is, by way of the fastening portion, fastened on an inner peripheral surface of the first bearing part. This avoids a situation in which impurities or the like pass under this seat and corrosion occurs, said corrosion adversely affecting the seal arrangement.

One embodiment of the disclosure provides that the wheel bearing flange, facing the wheel bearing, is formed with a radially extending side surface and is adjacent to an outer surface, which, on the second bearing part, is adjoined by rolling body raceways and receives the run-on part in the direction of the wheel bearing flange, and that a radial and/or axial groove formed in an encircling manner is arranged in a transition region between the outer surface and the side surface. The fact that the seating of the run-on part in this region is then unnecessary means that the groove or this region may be formed such that an improvement to component strength is the result. In this case, the groove may be arranged completely or partially in the outer surface and/or the side surface.

Preferably, a groove base of the groove is formed with at least one radius. The at least one radius of the groove can be matched to different geometries of the wheel bearing flange so as to minimize the stress in the transition region and also to increase the component strength. Here, a single radius as well as multiple radii may be provided.

Preferably, a clearance is formed between the transition region of the run-on part and the groove base. In said clearance, grease or sealant can accumulate and be optimally distributed, this further improving the seating of the run-on plate.

BRIEF DESCRIPTION OF THE DRAWING

Three exemplary embodiments according to the disclosure will be presented below on the basis of three figures. In the drawings.

DETAILED DESCRIPTION

Figure 1:
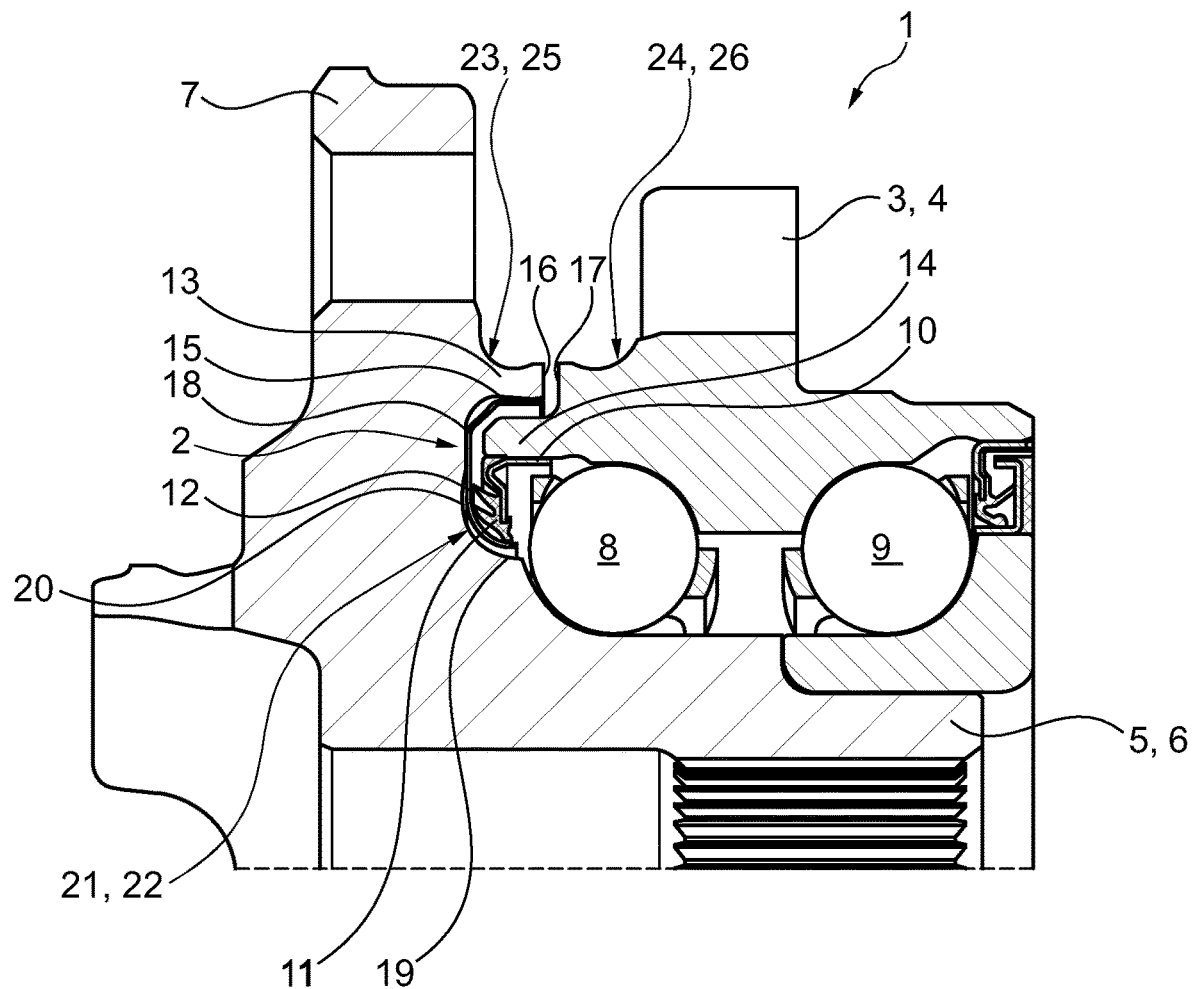
FIG. 1 shows a longitudinal section of a wheel bearing with a seal arrangement according to a first embodiment.

FIG. 1 shows a longitudinal section of a wheel bearing 1 (illustrated merely in part) with a seal arrangement 2 according to the disclosure. The wheel bearing 1 has a first bearing part 3, which is formed as an outer ring 4, and, in the state of installation, is connected to a wheel carrier (not illustrated). A second bearing part 5, which forms the inner ring 6, is also provided. The second bearing part 5 has a wheel bearing flange 7 which is connected in one piece. Two rolling body rows 8, 9 are guided between the first bearing part 3 and the second bearing part 5.

The seal arrangement 1 of the wheel bearing 2 comprises a carrier element 10, which is connected to the inner periphery of the first bearing part 3 by means of a press fit. An elastic element 11 is provided on the carrier element 10, wherein the elastic element 11 has at least one sealing lip. The carrier element 10 also has a fastening portion for fastening on the first bearing part 3. In order to avoid pitting corrosion below the fastening portion, a so-called static seal is formed by means of a sealing ring integrally formed on the elastic part.

The seal arrangement moreover has a run-on part 12, which is fastened to the second bearing part 5 and against which the at least one sealing lip is in rubbing contact. It can furthermore be seen that the wheel bearing flange 7 has an axial projection 13. This axial projection 13 at least partially surrounds an axial projection 14 of the first bearing part 3. On the basis of this embodiment, a pre-seal in the form of a labyrinth seal is formed. In this case, a first sealing gap is formed between an end side 16 of the axial projection 13 of the wheel bearing flange 7 and an end side 17 of the first bearing part 3. The end side 17 of the first bearing part is formed here on a side surface which radially adjoins the projection 14 and which extends radially away from rolling body rows 8, 9.

Furthermore, an inner surface 15 of the axial projection 13 of the wheel bearing flange 7 forms a seat for the run-on part 12. In this way, the seat known from the prior art in the region of the transition between the second bearing part 5 and the radial bearing flange 7 is not required.

The axial projection 13 is adjoined by a radially extending side surface 18. Furthermore, provision is made of an outer surface 19, which, on the second bearing part 5, is adjoined by rolling body raceways and is adjacent in the direction of the wheel bearing flange 7. The outer surface 19 may be of cylindrical form and have a conical profile. This outer surface 19 merges into the radially extending side surface 18 in a transition region 20. A radial, and/or axial, encircling groove 21 is formed in the transition region 20. The groove 21 is able to be matched to the respective geometry of the wheel bearing flange 7. A groove base 22 of the groove 21 is formed with at least one radius. A clearance is formed between the groove base 22 and the run-on part 12. Said clearance may be used for storing sealant, grease, etc.

It can furthermore be seen from FIG. 1 that, on an outer peripheral surface 23 of the wheel bearing flange 7 or of the projection 13 and on an outer peripheral surface 24 of the first bearing part 3, in each case one run-off channel 25, 26 is provided. These run-off channels 25, 26 form a type of pre-seal, which is intended to prevent the infiltration of dirt into the bearing interior.

Figure 2:
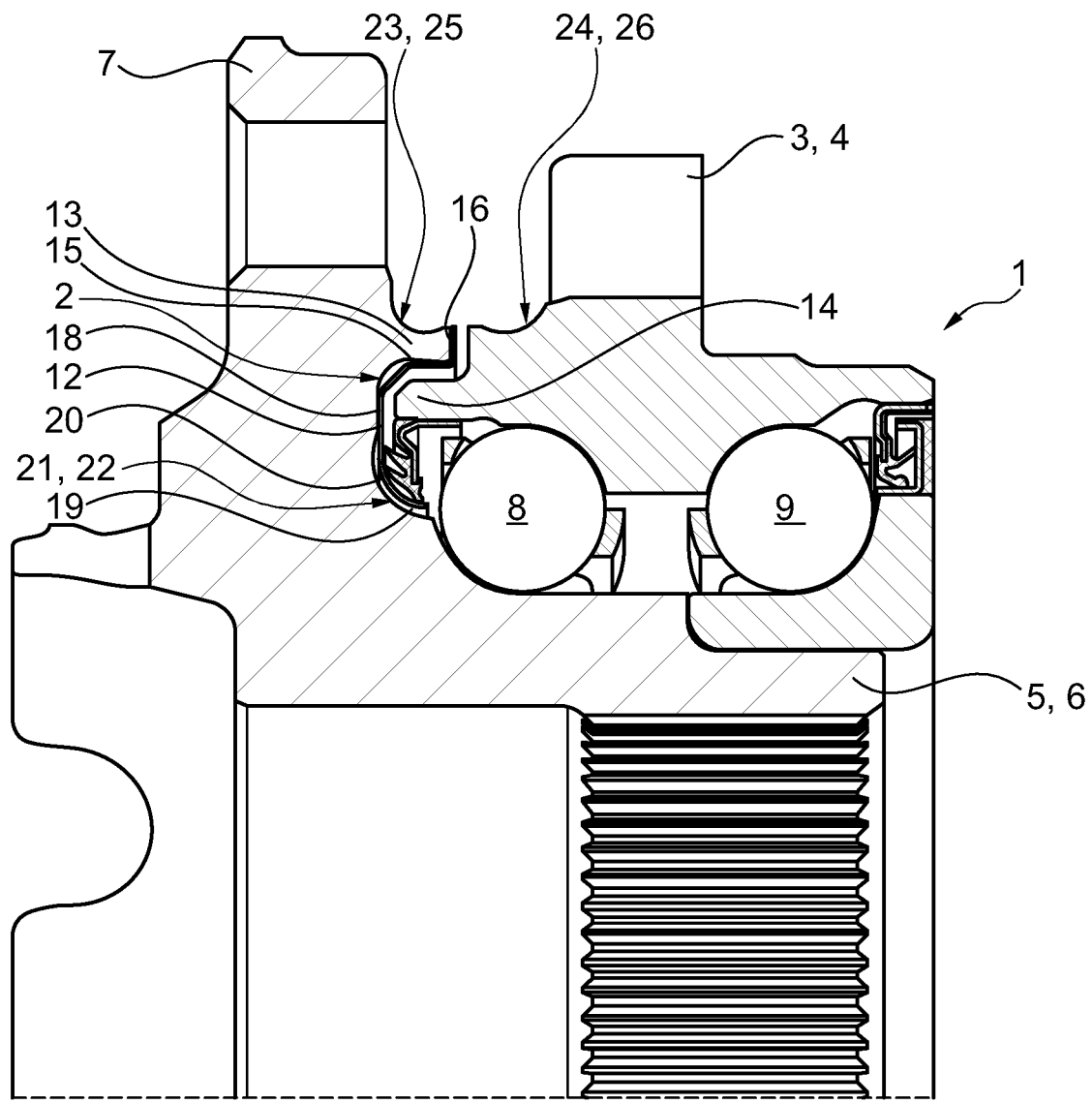
FIG. 2 shows a longitudinal section of a wheel bearing with a seal arrangement according to a second embodiment.
Figure 3:
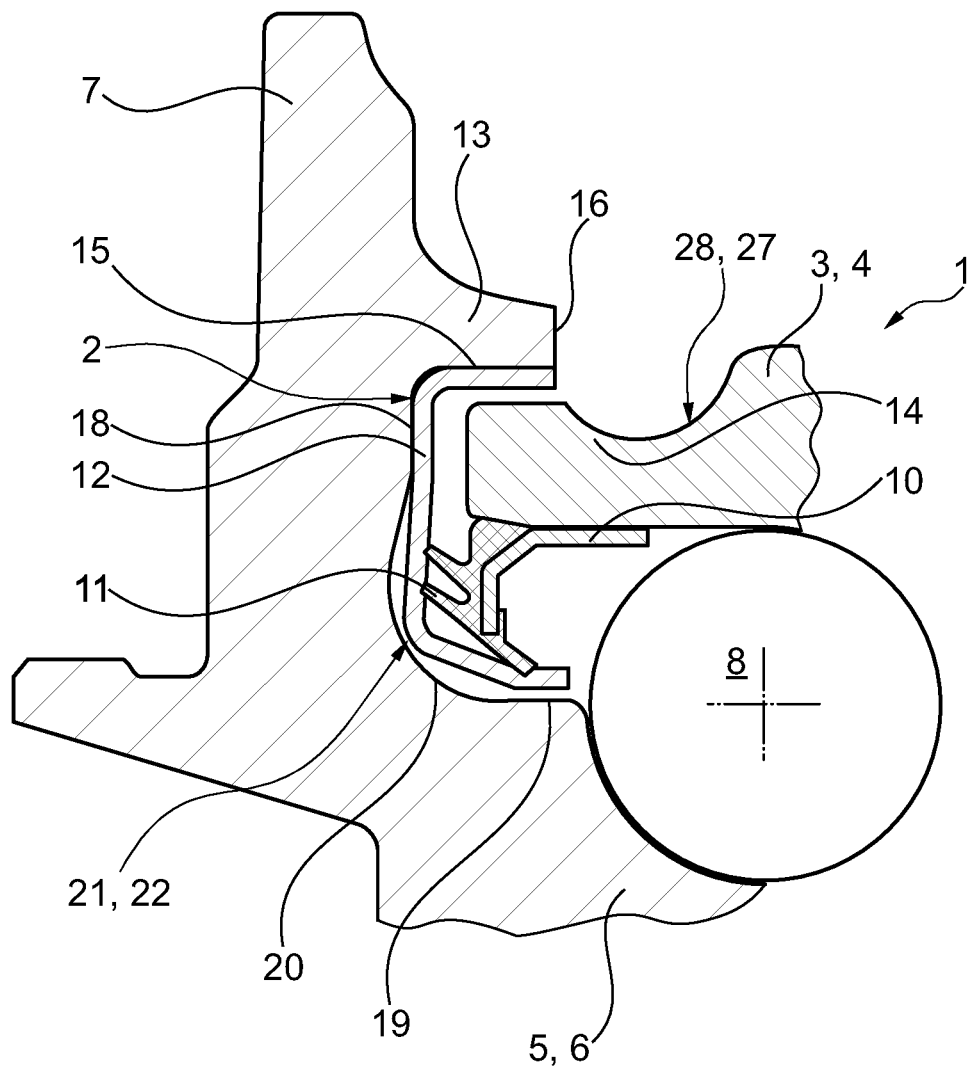
FIG. 3 shows a longitudinal section of a wheel bearing with a seal arrangement according to a third embodiment.

FIGS. 2 and 3 show further exemplary embodiments. Identical parts are denoted by the same reference signs as in the preceding FIG. 1.

FIG. 2 shows a second exemplary embodiment. The difference in relation to the preceding FIG. 1 is that the run-on part additionally extends radially along the end side 16.

FIG. 3 shows a third exemplary embodiment. Here, by contrast to the previous figures, merely one run-off channel 27 is provided. In this case, said run-off channel is formed on an outer circumferential surface 28 of the projection 14.

LIST OF REFERENCE SIGNS

1 Wheel bearing
2 Seal arrangement

3 First bearing part
4 Outer ring
5 Second bearing part
6 Inner ring
7 Wheel bearing flange
8 Rolling body row
9 Rolling body row
10 Carrier element
11 Elastic element
12 Run-on part
13 Projection of the wheel bearing flange
14 Projection of the first bearing part
15 Inner surface
16 End side
17 End side
18 Side surface
19 Outer surface
20 Transition region
21 Groove
22 Groove base
23 Outer circumferential surface
24 Outer circumferential surface
25 Run-off channel
26 Run-off channel
27 Run-off channel
28 Outer circumferential surface

The invention claimed is:

1. A seal arrangement of a wheel bearing having a first bearing part and having a second bearing part which is connected in one piece to a wheel bearing flange, rolling bodies being guided between said first and second bearing parts, the seal arrangement comprises:
a carrier element connected to the first bearing part;
an elastic element provided on the carrier element, the elastic element has at least one sealing lip;
a fastening portion connected to the first bearing part;
a run-on part fastened to the second bearing part and against which the at least one sealing lip is in rubbing contact;
an axial projection on the wheel bearing flange;
an axial projection on the first bearing part, the axial projection of the wheel bearing flange at least partially surrounds the axial projection of the first bearing part, and at least a portion of the run-on part also at least partially surrounds the axial projection of the first bearing part; and
an inner surface of the axial projection of the wheel bearing flange forms a seat for the run-on part.

2. The seal arrangement as claimed in claim 1, wherein a first sealing gap is formed between an end side of the axial projection of the wheel bearing flange and an end side of the first bearing part.

3. The seal arrangement as claimed in claim 1, further comprising at least one run-off channel on at least one of an outer peripheral surface of the wheel bearing flange or on an outer peripheral surface of the first bearing part.

4. The seal arrangement as claimed in claim 1, wherein the carrier element is fastened on an inner peripheral surface of the first bearing part by the fastening portion.

5. The seal arrangement as claimed in claim 1, wherein the wheel bearing flange, facing the wheel bearing, is formed with a radially extending side surface and is adjacent to an outer surface, which, on the second bearing part, is adjoined by rolling body raceways and receives the run-on part in a direction of the wheel bearing flange, and at least one groove formed with an encircling shape is arranged in a transition region between the outer surface and the side surface.

6. The seal arrangement as claimed in claim 5, wherein a groove base of the groove is formed with at least one radius.

7. The seal arrangement as claimed in claim 6, wherein a clearance is formed between the run-on part and the groove base.

8. A wheel bearing, comprising:
a first bearing part;
a second bearing part connected in one piece to a wheel bearing flange;
rolling bodies guided between said first and second bearing parts;
a seal arrangement including:
a carrier element connected to the first bearing part;
an elastic element provided on the carrier element, the elastic element having at least one sealing lip;
a fastening portion connected to the first bearing part;
a run-on part fastened to the second bearing part and against which the at least one sealing lip is in rubbing contact;
an axial projection on the wheel bearing flange;
an axial projection on the first bearing part, the axial projection of the wheel bearing flange at least partially surrounds the axial projection of the first bearing part and at least a portion of the run-on part also at least partially surrounds the axial projection of the first bearing part; and
an inner surface of the axial projection of the wheel bearing flange forms a seat for the run-on part.

9. The wheel bearing of claim 8, wherein a first sealing gap is formed between an end side of the axial projection of the wheel bearing flange and an end side of the first bearing part.

10. The wheel bearing as claimed in claim 8, further comprising at least one run-off channel on at least one of an outer peripheral surface of the wheel bearing flange or on an outer peripheral surface of the first bearing part.

11. The wheel bearing as claimed in claim 8, wherein the carrier element is fastened on an inner peripheral surface of the first bearing part by the fastening portion.

12. The wheel bearing as claimed in claim 8, wherein the wheel bearing flange, facing the wheel bearing, is formed with a radially extending side surface and is adjacent to an outer surface, which, on the second bearing part, is adjoined by rolling body raceways and receives the run-on part in a direction of the wheel bearing flange, and at least one groove formed with an encircling shape is arranged in a transition region between the outer surface and the side surface.

13. The wheel bearing as claimed in claim 12, wherein a groove base of the groove is formed with at least one radius.

14. The wheel bearing as claimed in claim 13, wherein a clearance is formed between the run-on part and the groove base.

* * * * *

UNITED STATES PATENT AND TRADEMARK OFFICE
CERTIFICATE OF CORRECTION

| | |
|---|---|
| PATENT NO. | : 11,193,543 B2 |
| APPLICATION NO. | : 16/772870 |
| DATED | : December 7, 2021 |
| INVENTOR(S) | : Peter Niebling et al. |

It is certified that error appears in the above-identified patent and that said Letters Patent is hereby corrected as shown below:

On the Title Page

At item "(73) Assignee: SCHAEFFLER TECHNOLOGIES AG & CO. KG, Herzogenaurach (CH)":
Delete "(CH)" and insert --(DE)--.

Signed and Sealed this
Nineteenth Day of April, 2022

Katherine Kelly Vidal
*Director of the United States Patent and Trademark Office*